(12) United States Patent
Nakajima (10) Patent No.: US 9,178,312 B2
(45) Date of Patent: Nov. 3, 2015

(54) CHARGING PORT LOCKING DEVICE

(71) Applicant: Nissan Motor Co., Ltd., Yokohama, Kanagawa (JP)

(72) Inventor: Tsuyoshi Nakajima, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/346,587

(22) PCT Filed: Sep. 18, 2012

(86) PCT No.: PCT/JP2012/073801
§ 371 (c)(1),
(2) Date: Mar. 21, 2014

(87) PCT Pub. No.: WO2013/054648
PCT Pub. Date: Apr. 18, 2013

(65) Prior Publication Data
US 2014/0235086 A1    Aug. 21, 2014

(30) Foreign Application Priority Data
Oct. 13, 2011    (JP) ................ 2011-225415

(51) Int. Cl.
*H01R 13/62* (2006.01)
*H01R 13/639* (2006.01)
*B60L 11/18* (2006.01)
*B60L 3/00* (2006.01)
*H01R 13/627* (2006.01)

(52) U.S. Cl.
CPC ............ *H01R 13/639* (2013.01); *B60L 3/0023* (2013.01); *B60L 11/1818* (2013.01); *B60L 11/1825* (2013.01); *B60L 11/1877* (2013.01); *B60L 2270/32* (2013.01); *B60L 2270/34* (2013.01); *H01M 2220/20* (2013.01); *H01R 13/6275* (2013.01); *H01R 13/6397* (2013.01); *Y02T 10/7005* (2013.01); *Y02T 10/705* (2013.01); *Y02T 90/121* (2013.01); *Y02T 90/128* (2013.01); *Y02T 90/14* (2013.01)

(58) Field of Classification Search
CPC .................... H01R 13/6397; H01R 13/62933
USPC ........................................ 439/304, 310, 133
See application file for complete search history.

(56) References Cited

U.S. PATENT DOCUMENTS

| 5,906,500 | A  | * | 5/1999  | Kakuta et al. ............... 439/310 |
| 6,203,355 | B1 | * | 3/2001  | Neblett et al. ............... 439/372 |
| 8,075,329 | B1 | * | 12/2011 | Janarthanam et al. ........ 439/304 |
| 8,376,768 | B2 | * | 2/2013  | Kurumizawa et al. ........ 439/304 |

(Continued)

FOREIGN PATENT DOCUMENTS

| JP | 9-191884 A    | 6/1997 |
| JP | 2011-165558 A | 8/2011 |

*Primary Examiner* — Hae Moon Hyeon
(74) *Attorney, Agent, or Firm* — Global IP Counselors, LLP (57) ABSTRACT

A charging port locking device is provided that basically includes a charging port and a lock mechanism. The lock mechanism achieves both locked and unlocked states by rotational movement of the restricting member. The restricting member is configured in the lock state with respect a reference line connecting a center of rotation of the restricting member and the center of width of the engaging portion as seen in a top view such that a top view area of the restricting member from the reference line in the rotational direction toward a restricting state is smaller than a top view area of the restricting member from the reference line in the rotational direction toward a non-restricting state.

3 Claims, 10 Drawing Sheets

(56) References Cited

U.S. PATENT DOCUMENTS

| | | | |
|---|---|---|---|
| 8,517,755 B2* | 8/2013 | Hirashita | 439/304 |
| 8,523,589 B2* | 9/2013 | Kurumizawa et al. | 439/304 |
| 8,602,804 B2* | 12/2013 | Kurumizawa et al. | 439/304 |
| 8,753,136 B2* | 6/2014 | Hirashita et al. | 439/304 |
| 8,944,477 B2* | 2/2015 | Proefke et al. | 292/144 |
| 2011/0300728 A1* | 12/2011 | Katagiri et al. | 439/147 |
| 2012/0238122 A1* | 9/2012 | Hirashita et al. | 439/304 |
| 2014/0235086 A1* | 8/2014 | Nakajima | 439/347 |
| 2014/0235087 A1* | 8/2014 | Nakajima | 439/347 |
| 2014/0235089 A1* | 8/2014 | Nakajima | 439/350 |
| 2014/0300319 A1* | 10/2014 | Nakajima | 320/109 |
| 2014/0300320 A1* | 10/2014 | Nakajima | 320/109 |
| 2015/0035478 A1* | 2/2015 | Uchiyama et al. | 320/107 |
| 2015/0037994 A1* | 2/2015 | Nakajima | 439/304 |

* cited by examiner

CHARGING PORT LOCKING DEVICE

CROSS-REFERENCE TO RELATED APPLICATIONS

This application is a U.S. National stage application of International Application No. PCT/JP2012/073801, filed Sep. 18, 2012, which claims priority to Japanese Patent Application No. 2011-225415 filed in Japan on Oct. 13, 2011.

BACKGROUND

1. Field of the Invention

The present invention relates to a locking device of a charging port for charging a battery mounted on the vehicle.

2. Background Information

As a technique related to a charging port locking device, the technique is disclosed as described in Japanese Laid-Open Application Publication No. H9-161884. In this publication, a charging connector for connecting a charging station as a power supply unit to a charging port of an electric vehicle to allow a charging operation by connecting the charging connector to the charging port.

SUMMARY

Here, in a vehicle such as an electric vehicle equipped with a battery of relatively large capacity, when charging at the charging station, a charging operation over a relatively long time may be considered. At this time, if the connection between the charging connector and charging port is inadvertently, i.e., due to factors other than the driver's intention, disconnected or disengaged, charging will not be performed. This would lead to a situation in which, even if the driver returns after a planned charging period, charging is not yet completed.

The present invention has been made in view of the above problems, and aims to provide a charging port locking device capable of avoiding a situation in which the connection between the charging connector and the charging port is released unexpectedly during charging.

In order to achieve the above object, in the charging port locking device according to the present invention, a charging port to which electric power from an external power source is supplied through a charging connector by the operation of an operator is provided with a cover that covers a lock mechanism for achieving both locked and unlocked states in response to rotational movement of a restricting or limiting member from a charging connector insertion and removal side. Further, the restricting member is configured such that, with respect a reference line connecting the center of rotation thereof when placed in the separating direction of the engaging member and the center of rotation of the engaging member, the top view area in the rotational direction toward a restricting state is smaller than the top view area in the rotational direction toward a non-restricting state.

Therefore, it is possible to prevent the charging connector from being disengaged accidentally by connecting the charging connector to the charging port and subsequently to restrict or limit the operation of the engaging member by the restricting member. Further, it is possible to reduce the roof portion of the restricting member covering the engaging member to thereby make it difficult for icicle-shaped obstacles to be formed. Therefore, the restricting member may be operable smoothly when releasing the lock.

BRIEF DESCRIPTION OF THE DRAWINGS

Referring now to the attached drawings which form a part of this original disclosure.

EMBODIMENTS FOR CARRYING OUT THE INVENTION

First Embodiment

Figure 1:
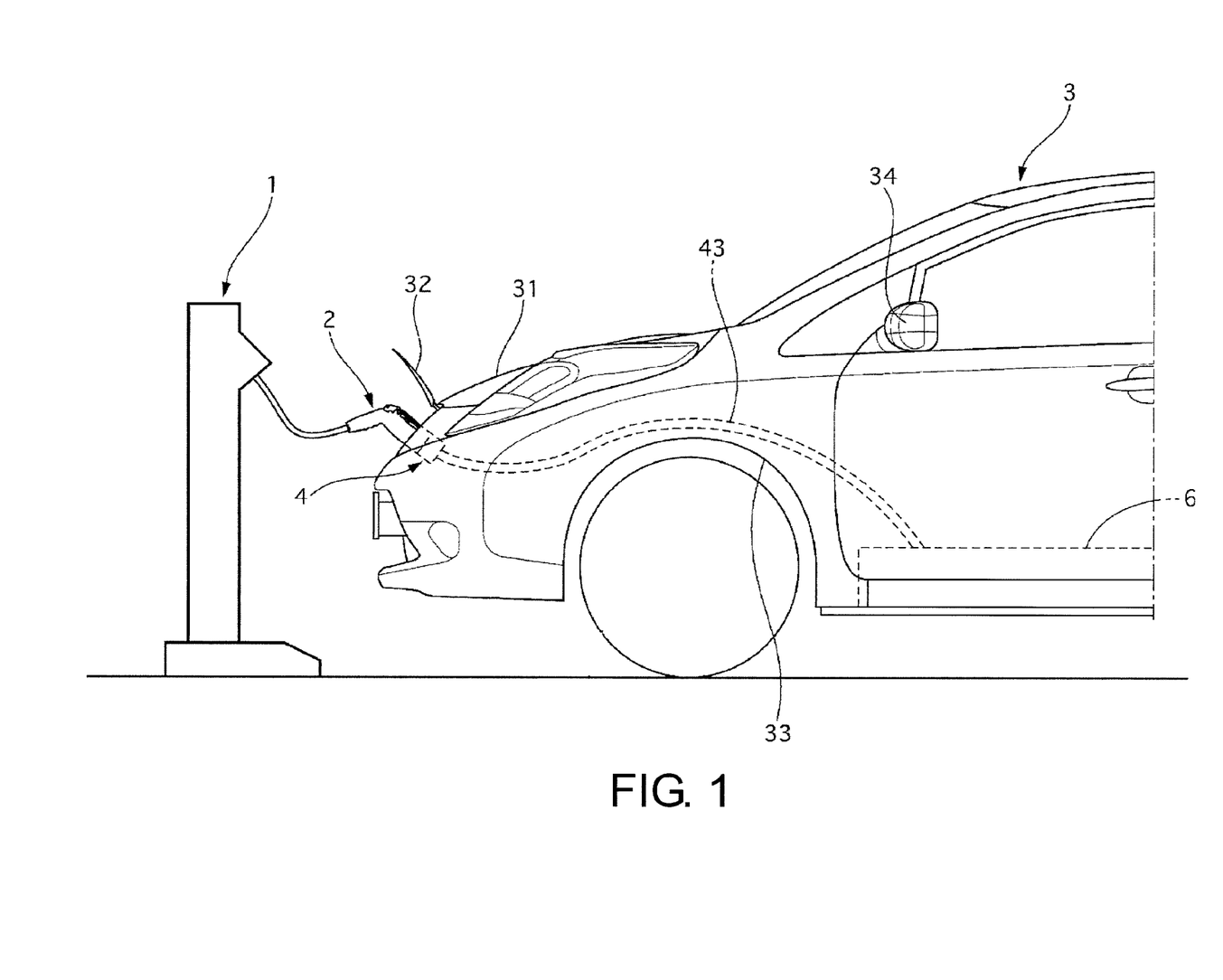
FIG. 1 is a schematic diagram showing a state during charging of a vehicle provided with a charging port locking device in a first embodiment.

FIG. 1 is a schematic diagram showing a state during charging of a vehicle provided with a charging port locking device in a first embodiment. In front of the vehicle 3, and forward of a hood 31, a charging port 4 is provided which is electrically connected to a vehicle battery 6 mounted on a floor of a vehicle 3 by a cable or code 43. This charging port is positioned at a height substantially equal to that of a top end of a tire wheel arch 33 and lower than a side mirror 34, and is closed by a charging lid 32 in a non-charging state. A charging stand 1 is provided with a charging connector 2 for supplying power, and, during a charging state, by opening the charging lid 32 and plugging the charging connector 2 in the charging port 4, a charging operation is performed. Note that the vehicle in the first embodiment is provided with both a quick charging port for coupling with a quick or fast charger and a normal charging port when charging at home, etc. In the first embodiment, the operations are discussed during the normal charging process. When using the fast charging port, the connection is of a relatively short period of time, so that such scenes are less frequent in which the vehicle is left for a long time. Note that a lock mechanism according to the present invention may be also provided for a quick charge port side, as a matter of course.

Figure 2:
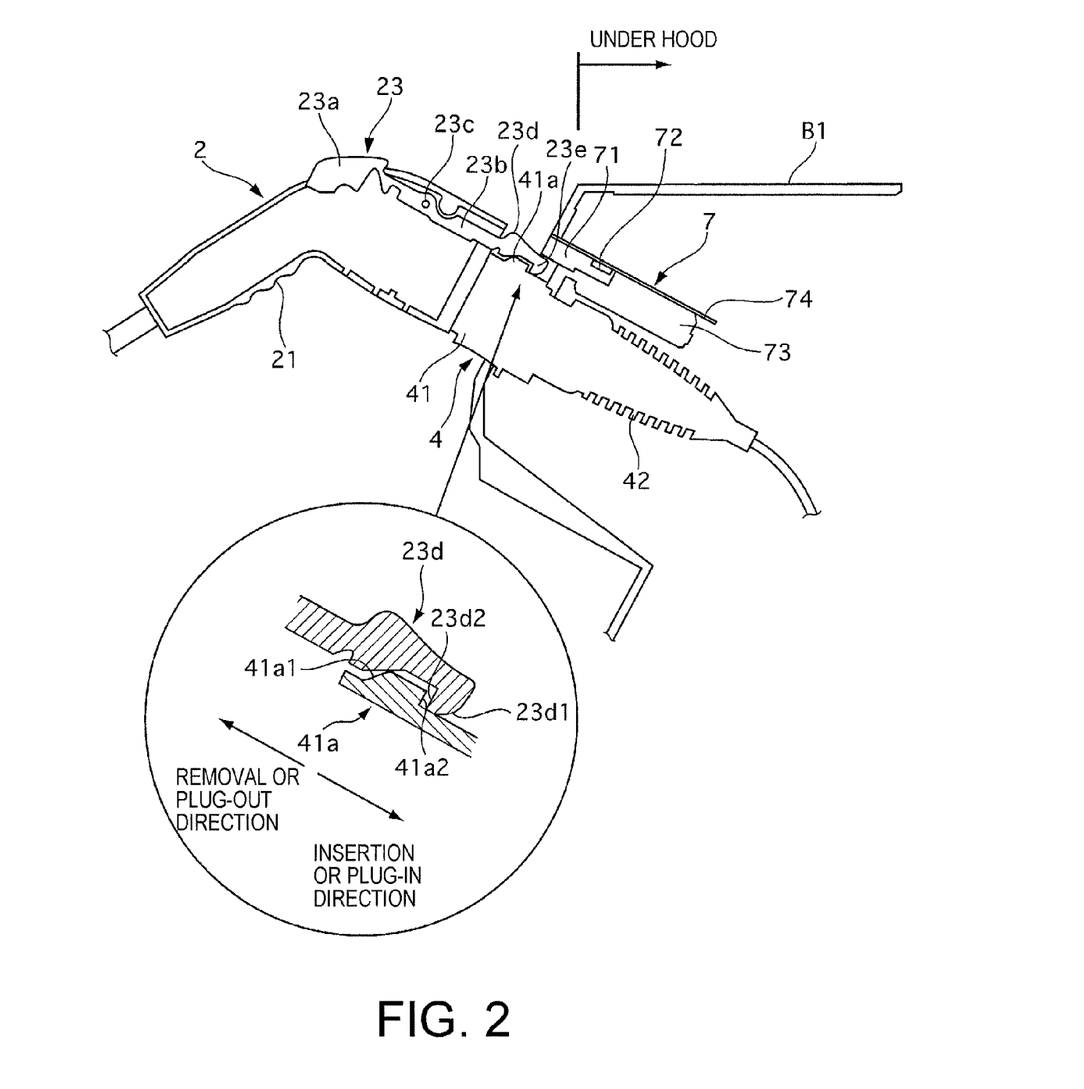
FIG. 2 is a schematic sectional view showing a state in which a charging connector and a charging port are being connected in the first embodiment.

FIG. 2 is a schematic sectional view showing a state in which a charging connector in the first embodiment is connected to a charging port. The charging port 4 has a inserted or receiving member 41 fixed to a body part B1 through a bracket 74 for insertion of the charging connector 2, a cable 43 connected to the inserted member 41 in the interior of vehicle body, and a tube 42 covering a junction portion of this cable 43. A convex or protruding portion 41a (engaged portion) is formed about the outer periphery of the inserted member 41, while an insertion hole is formed in an inner periphery of the inserted member 41, which allows the insertion only in a predetermined positional relationship to an insertion portion (not illustrated).

The charging connector 2 is of a generally widely installed type and has a standard product size and format determined by the unified standard. The charging connector 2 is connected to the charging port 4 of the vehicle by the operator. The charging connector 2 has a grip portion 21 to be griped by the operator, the insertion portion to be inserted with respect to the charging port 4 on the vehicle side, and an engaging member 23 capable of engagement with and release of the charging port 4 by the operator. The engaging member 23 engages with the convex portion 41a formed on the charging port 4, when the charging connector 2 is connected to the charging port 4, to thereby restrict the movement in a direction in which the charging connector 2 is released or plugged out of the charging port 4.

The engaging member 23 is a member that rotates about a support point 23c (first pivot axis) which is fixed to a case member of the charging connector 2. The engaging member 23 is biased such that a release button 23a is positioned by an elastic member (not shown) at the upper side in FIG. 2 (so that a claw portion 23d is positioned at the lower side in FIG. 2). An end on the grip portion 21 is provided with the release button 23a for allowing an operator to press while holding the grip portion 21. On the other end of the insertion portion, a claw portion 23d is formed for engagement with the convex portion 41a. The claw portion 23d is formed in a claw shape with a curved surface portion 23d1 in which the tip portion has a smooth curved surface with respect to the insertion direction and a step portion 23d2 that forms an acute angle with respect to the release direction. On the other hand, a slope 41a1 is formed on the end face toward vehicle exterior while an engagement surface 41a2 extending generally vertically with respect to the release direction is formed on an end surface toward the vehicle interior so that an anisotropic or asymmetrical convex shape may be formed.

When the charging connector 2 is inserted into the charging port 4, without having to act on the release button 23a for special operations, the curved portion 23d1 of the tip portion of the claw portion 23d may get over the slope of the convex portion 41a. Thereafter, upon a step portion 23d2 passing through the engagement surface 41a2, the claw portion 23d is pushed downward by the action of the elastic member (not shown), and the convex portion 41a and the claw portion 23d are engaged with each other. Note that it is also possible to insert the charging connector 2 while pressing the release button 23a. Thus, even if the operator would pull the charging connector 2 in the direction of extracting or releasing the charging connector 2 in a state where the operator does not operate the release button 23a, the movement in the releasing direction may be restricted by the engagement between the step portion 23d2 and the engagement surface 41a2. In order to release this engagement, the engaging member 23 is caused to rotate about the support point 23c in response to pressing down of the release button 23a to thereby move the claw portion 23d above the engagement surface 41a2 to release the engagement.

Figure 3:
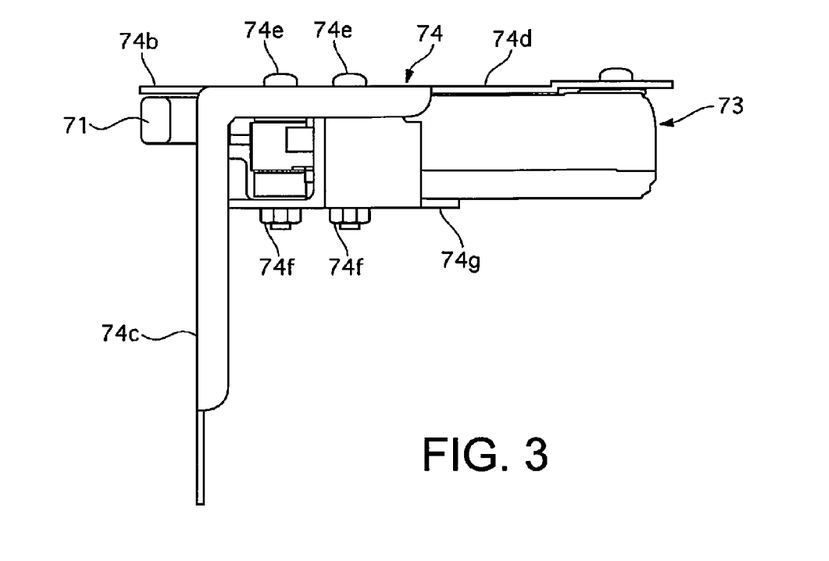
FIG. 3 is a side view showing a structure of a lock mechanism in the first embodiment.
Figure 4:
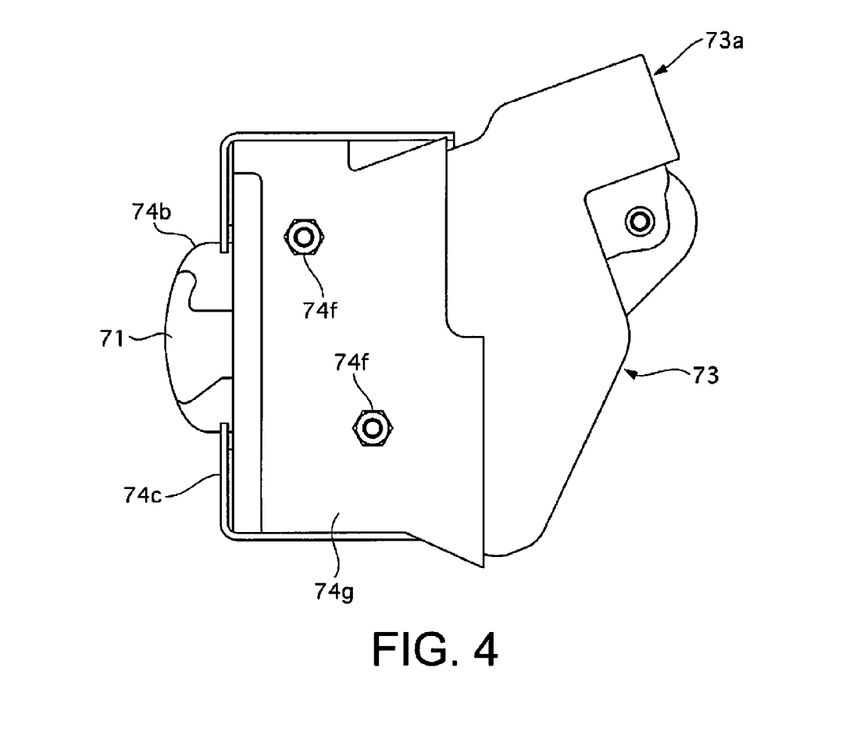
FIG. 4 is a bottom view showing a structure of the lock mechanism in the first embodiment.

FIG. 3 is a side view showing a structure of a lock mechanism in the first embodiment while FIG. 4 is a bottom view showing a structure of the lock mechanism in the first embodiment. Above the charging port 4, a lock mechanism 7 is provided for restricting or limiting the rotation of the engaging member 23. The lock mechanism 7 includes a swing arm 71 that achieves, by being located in a separating direction between the claw portion 23d and a convex portion 41a, a separation limiting or restricting state, and further achieves a separation permissible state by not being located in the separating direction. The lock mechanism further includes a lock actuator 73 for driving the swing arm 71 and a bracket 74 for fixing and supporting the lock actuator 73 and the inserted member 41 of the charging port 4.

As shown in the side view in FIG. 3 as well as in the bottom view of FIG. 4, the bracket 74 includes an upper surface portion 74d for fixing and supporting the lock actuator 73 by bolts 74e, a support extension 74b extending from the upper surface portion to cover a movement range of the swing arm 71, a side surface portion 74c bent substantially perpendicular to the upper surface portion 74d for having the inserted member 41 etc. through bolts affixed thereto, and a cover member 74g for sandwiching the lock actuator 73 with the upper surface portion 74d. The upper surface portion 74d, the lock actuator 73, and the cover member 74g are assembled integrally by way of a plurality of bots 74e and nuts 74f. An opening 74a for compulsory or forcible operation during a failure (see FIGS. 2, 7, etc.) is formed on the upper surface portion 74d for manipulation or operation of a fixing screw 72 (described below) so as to be rotatable by way of a screwdriver etc. by the driver with the hood being opened. The reason will be described below.

Figure 5:
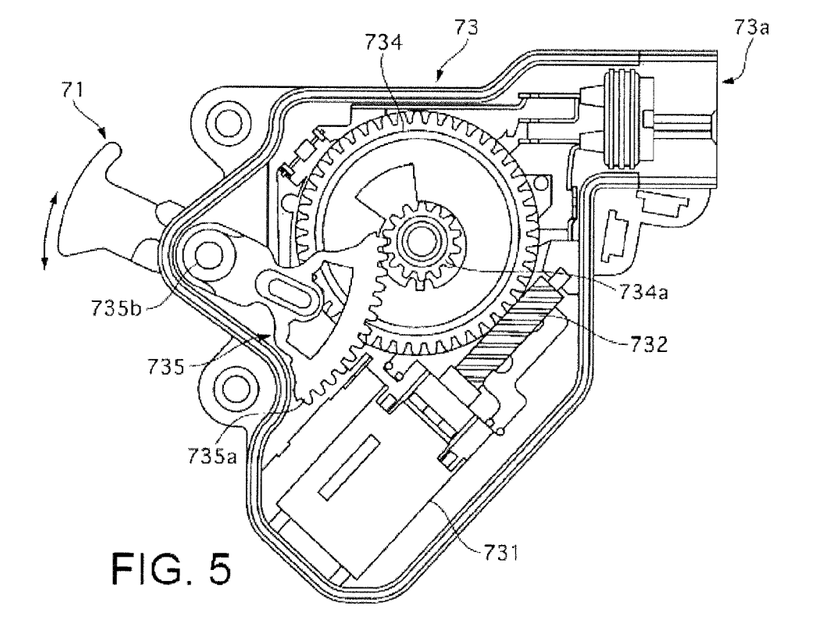
FIG. 5 is an internal structural diagram showing a mechanical configuration of the lock mechanism in the first embodiment.

FIG. 5 is an internal structural diagram showing a mechanical configuration of the lock mechanism in the first embodiment. The lock actuator 73 is provided with a connector portion 73a for connecting both an external power source and a controller, a motor 731 driven to rotate in accordance with a command signal, a worm gear 732 rotatable integrally with a rotor of the motor 731, a worm wheel meshed and integrally rotatable with the worm gear 732, a drive gear 734a which rotates integrally with the worm wheel 734 and has the same rotating shaft with a smaller diameter than the worm wheel 734, and a driven member 735 which meshes with the drive gear 734a and has a tooth surface on the outer circumference thereof. The driven member 735 is substantially fan-shaped is provided with a meshing portion 735a formed with a tooth surface on the outer periphery and a rotating shaft portion 735b to be assembled integrally with the swing arm 71. The swing arm 71 is a member that operates with the rotation shaft portion 735b as a rotation shaft. In other words, the swing arm 71 has a rotation axis, the direction of which is different both from the insertion and release direction of the charging connector 2 and the direction of rotation axis of the engaging member 23. Since, in the lock mechanism in the first embodiment, it is sufficient for the swing arm 71 to rotate within a predetermined angular range, even with the use of the driven member 73 provided with tooth surface only partly, an operation is allowable with a small sized motor while ensuring a sufficient torque. Note that this lock actuator is being adapted to the automatic door lock mechanism of a vehicle in general, it is possible to reduce the manufacturing cost when adopted as such without substantial modification of the components thereof.

Figure 6:
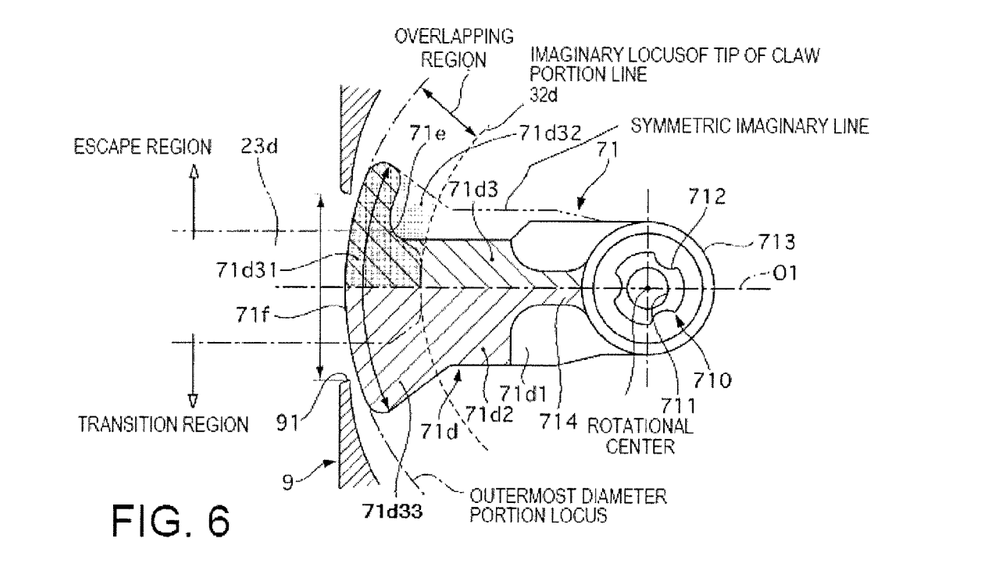
FIG. 6 is a bottom view showing a configuration of the swing arm of the lock mechanism in the first embodiment.

FIG. 6 is a bottom view showing the structure or configuration of the swing arm of the lock mechanism in the first embodiment. The swing arm 71 includes a mounting portion 710 attached to the rotating shaft portion 735b of the lock actuator 73 so as not to rotate relative thereto, and a cylindrical wall 713 of cylindrical shape covering the outer periphery of the mounting portion 710. The mounting portion 710 is formed with recesses 712 allocated in three places circumferentially, and by receiving concave portion 712 formed on the side of the rotation shaft portion 735b, a relative movement in the rotational direction will be restricted. A through hole 711 is formed in the center of the mounting portion 710 for passing through a fixing screw 72 to fastening or fixing together the swing arm 71 and the rotation shaft member 735 integrally. Since this through hole 711 causes an upper part of the swing arm 71 and the lock actuator 71 in a communicating state. Thus, even if the swing arm 71 will be difficult to be operated due to freezing or the like, by pouring or applying hot water to improve the frozen state, a communication passage will be formed to function for communicating the hot water so that the frozen state will be quickly improved. The fixing screw 72 is fixed by a female screw portion provided on the side of the rotating shaft portion 735, and both the rotating shaft portion 735 and the swing arm 71 will thus be operated integrally.

Note that a tightening direction of the fixing screw 72 is set to be the same as a direction in which the swing arm 71 is rotated in the unlocking direction. That is, even if a failure or the like occurs in the lock actuator 73 and a release operation is no longer possible at all, by tightening the fixing screw 72 allows the swing arm 71 to rotate in the releasing direction.

Figure 7:
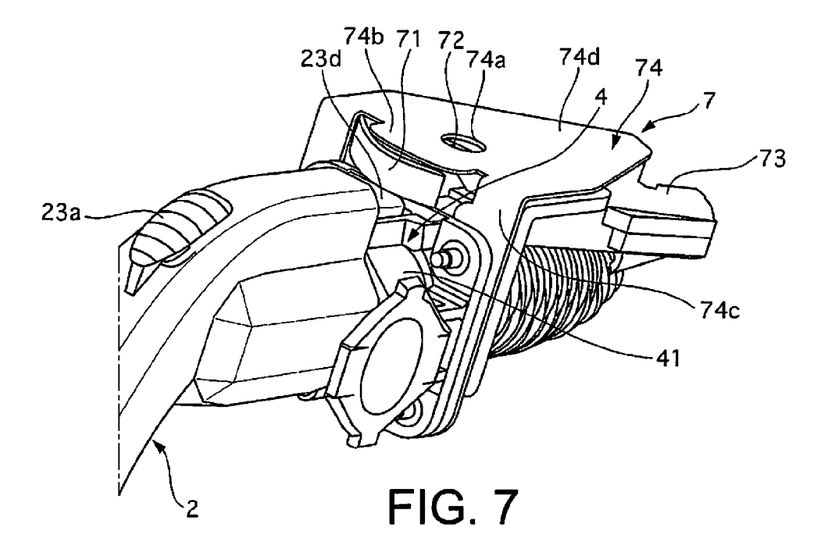
FIG. 7 is a schematic perspective view of a state in which the charging connector and the charging port are connected to each other in the first embodiment.

FIG. 7 is a schematic perspective view showing a state in which a charging connector and a charging port are connected to each other. More specifically with reference to FIGS. 2 and 7, the fixing screw 72 is provided in an opening 74a for a compulsory operation during a failure so as to be exposed within a bonnet hood. Since a hood release lever in the passenger compartment is typically operated in order to open the hood, the fixing screw is thus considered to be disposed at an easily accessible position once the release lever is opened. In contrast, the fixing screw 72 is not disposed at an easily accessible position even if a charging lid 32 is opened. Therefore, the arrangement is made so as not to be freely accessible by others who is inaccessible in the passenger compartment. Further, since the fixing screw is configured to be operative easily with a Phillips screwdriver or the like, available in an onboard tool kit or the like, it is releasable by the operator.

The swing arm 71 has an arm member 71d having a plate shape that extends from the cylindrical wall 713 on the left side in FIG. 6. The arm member 71d is expanded in a fan shape at the tip, and is designed to overlap with a claw portion 23d in a top view (i.e., corresponding to a state in which the arm member 71d is located in the separation direction of the engaging member). Thus, the arm member 71d of the swing arm 71 including an outermost peripheral portion having a distal end surface facing away from the rotational center (axis O1). The overlapping section of the swing arm 71 corresponds to a region of the swinging arm 71 between a first arc with a curvature centered on the rotational center (axis O1) and a second arc with a curvature centered on the rotational center (axis O1). As seen in FIG. 6, the first arc intersecting with an outermost point of the swing arm 71 from the rotational center. As seen in FIG. 6, the second arc intersecting with a point of the engaging portion (i.e., the claw portion 23d) of the charging connector 3 that is closest to the rotational center (axis O1) while in an engaged state. The arm member 71d is formed with a lightening portion 71d1 to reduce weight and with the ribs 714 to ensure the required strength. As seen in FIG. 6, the overlapping section of swing arm 71 can be divided into an outermost peripheral portion that is symmetrical and an intermediate portion that is asymmetrical. The intermediate portion of the overlapping section of swing arm 71 includes a first intermediate portion (an area 71d2 shown in FIG. 6) extending in the unlocking direction from the reference line and a second intermediate portion (an area 71d3 shown in FIG. 6) extending in the locking direction from the reference line, and a top view area of the first intermediate portion is greater than a top view area of the second intermediate portion.

The swing arm 71 is molded of resin and formed in a shape vertically asymmetric in top view, as shown in FIG. 6. Hereinafter, an assumption is made in which the center of rotation of the swing arm 71 (a point where the center of the swing arm 71 in the thickness direction and the rotation axis meet) and the center of rotation of the engaging member 23 in a locked state (a point where the center of the engaging member 23 in the width direction and the rotation axis intersects) are connected to define an axis O1 as a reference line in a top view. Then, symmetric imaginary lines that are symmetric vertically are drawn by dotted lines. The relationship of these symmetric imaginary lines is now described. An upper part is considered to be a region from which the swing arm 71 escapes when the lock mechanism is moving from the restricting state to the non-restriction state. Thus, an upper region above the axis O1 is defined as an escape region and a lower region below is defined as a transition region. Further, in FIG. 6, a locus the tip of the claw portion 23d passes when the swing arm 71 is being rotated is shown in a dashed line as the locus of the outermost diameter portion while a locus the tip of the claw portion 23d passes when the swing arm 71 is rotated is shown in a dotted line as the tip imaginary locus of the claw portion 23. In addition, the region defined between the locus of the outermost diameter portion and the locus of the tip is defined as an overlapping section or region representing a locus overlapped by both the swing arm 71 and the claw portion 23d in a top view.

If the escape region and the transition region of the swing arm 71 are symmetrical to each other, a large area is present which is located in the escape region side farther of the claw portion 23d. In this case, following problems were present. That is, since the charging port 4 is disposed at a relatively lower position of the vehicle, such a situation is expected in which sherbet-like snow or muddy water fly up caused by other vehicles travelling nearby and scattered on the charging port 4. Also, when charging in the cryogenic environment, the mud or snow sherbet that has been scattered may freeze to form an obstacle shaped in icicles hanging from the arm member 71d of the swing arm 71 as a roof. In this case, with a large region of the arm member 71d in the escape region, it is likely that obstacles of icicle shape will be formed, so that, even if a lock release command is output, the obstacle on the swing arm 71 might engage with the claw portion 23d, locking stated will not be released. In particular, a problem arises when the area of escape region is large in the overlapping region that represents locus overlapped by the swing arm 71 and the claw portion 23d.

Therefore, it has been decided that the arm member 71d is cut out largely. Specifically, a removed region 71d32 in top view that would pose a problem if present in the overlapping region is removed. Thus, with respect to the areas of the swing arm 71 in the overlapping region, when the area of the region 71d31 in the rotational direction to the lock state is defined as a1 relevant areas of removed region 71d32 is defined as a2, and the area of the region 71d33 in the rotational direction to the unlock state is defined as b, respectively, it is configured that the following relationship is established:

$$a1+a2=b$$

$$a1<b.$$

In other words, the area 71d3 of the arm member 71d existing in the escape region (an area in top view in the rotational direction to the restricting state with respect to a reference line connecting the center of rotation of the swing arm 71 when placed in the separating direction of the claw portion 23d and the center of rotation of the claw portion 23d) is set smaller than the area 71d2 of the arm member 71d existing in the transition region (an area in top view in the rotational direction to the non-restricting state with respect to a reference line connecting the center of rotation of the swing arm 71 when placed in the separating direction of the claw portion 23d and the center of rotation of the claw portion 23d). Thus, the roof area in the escape region may be held small and the icicle-like obstacle and the like will less likely to be formed so that the swing arm 71 may be operable smoothly when releasing the lock. In particular, since by cutting out the area barely overlapping the claw portion 23d in top view, it is possible to reduce the possibility that the obstacles and the like will be formed while reliably restricting movement of the claw portion 23d in a separating direction reliably.

Further, with respect to a top view shape of the outermost diameter portion 71f of the swing arm 71, a symmetrical shape is formed with reference to axis O1 as a reference line. That is, when the swing arm 71 is rotated by the operation of the lock actuator 73 and assuming an insufficient rotation due to failure or the like, the more the length of the outermost diameter portion 71f is secured, more reliably the swing arm 71 may be positioned in the separating direction of the claw portion 23d.

Figure 8:
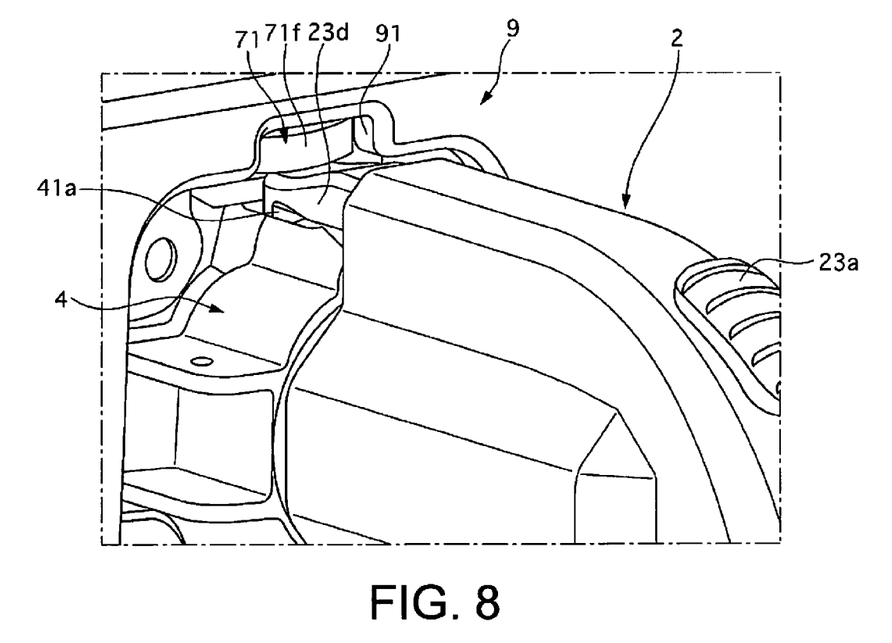
FIG. 8 is a perspective view of a state in which the charging connector and the charging port are connected to each other in the first embodiment.

FIG. 8 is a perspective view in a state in which the charging connector is connected to the charging port in the first embodiment. By inserting the charging connector 2 into the charging port 4, and positioning the swing arm 71 in the separating direction of the claw portion 23d due to operation of the lock mechanism 7, the claw portion 23d cannot move in the separating direction even if the release button 23a is pressed. Thus, it is impossible to release the engagement between the convex portion 41a and the claw portion 23d so that the charging connector 2 is prohibited from being plugged out or withdrawn. At this time, the charging port 4 of the vehicle is protected from the entry of dust or the like into the lock mechanism 7 by providing a cover member 9. The cover member 9 covers the lock mechanism 7 from the direction of insertion and removal i.e., plug-in and -out of the charging connector 2 and has an opening 91 for enabling the claw portion to be inserted and exposing a part of the swing arm 71.

It is assumed that the operator inserts the charging connector 2 into the charging port 4 and operates the lock mechanism 7 to thereby start charging operation with the operator being left and unattended. In this state, as shown in FIG. 8, the outermost diameter portion 71f of the swing arm 71 is in a state of being exposed. Suppose that a large gap between the outermost diameter portion 71f and the cover member 9, then it is possible to forcibly break and open the swing arm 71 by placing a finger or the like into the gap. Therefore, the gap between the swing arm 71 and the cover member 9 is set narrow to the extent that both are not in not in contact.

Further, in a state in which the charging connector 2 is being restricted to be removed by the lock mechanism 7, all of the openings 91 is set closed by the outermost diameter portion 71f of the swing arm 71. In other words, the length of the outermost diameter portion 71f in the rotational direction is set longer than the width of opening 91 (the length along the rotational direction). This arrangement is intended, as described above, to exclude the possibility that the swing arm 71 may be forcibly broken by placing a finger or the like into a gap which would be otherwise present between ends of the opening 91 and the end of the swing arm 71.

Further, coming back again to FIG. 6, the relationship between the cover member 9 and the swing arm 71 is now detailed. As shown in FIG. 6, the distance between the inner periphery of the cover 9 and the outermost diameter portion 71f of the swing arm 71 when rotated is set larger as the distance from the opening 91 is larger. Stated another way, if the charging connecter 2 is connected to the charging port 4 in a state in which dust and the like (chewing gum, mud, dust, etc.) is attached on the claw portion 23d, in response to a rotational movement of the swing arm 71, a sweeping operation is assured while scraping off these rubbishes. In this instance, assuming that the distance between the inner periphery surface of the cover member 9 and the locus of outermost diameter portion 71f would be set narrower gradually, the rubbish scraped out will enter this gap so that a large resistance will be encountered and the operation of the swing arm 71 will be impaired. Thus, by setting the distance between the inner periphery of the cover member 9 and the outermost diameter portion 71f is set greater in accordance with the distance from the opening 91, the scraped out rubbish will be appropriately falls down and an eventual dust clogging may be avoided.

Figure 9:
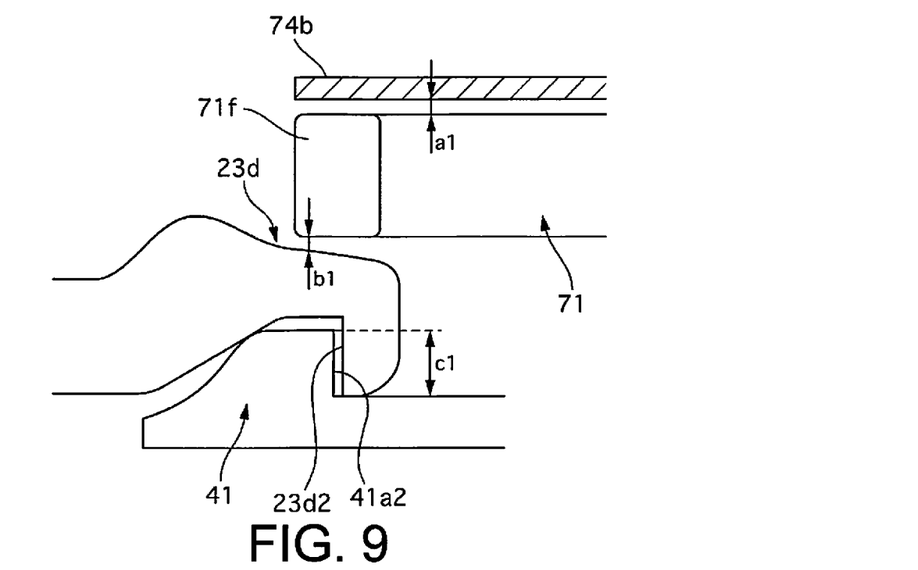
FIG. 9 is a schematic cross-sectional view showing a positional relationship between the engaging member and the swing arm in the first embodiment.

FIG. 9 is a schematic sectional view showing the positional relationship between the engaging member and the swing arm in the first embodiment. A predetermined gap a1 is provided between the upper surface of the swing arm 71 and the support extension 74b while a predetermined gap b1 is provided as well between the lower surface of the swing arm 71 and the claw portion 23d. Therefore, when the swing arm 71 is rotated, there will be no contact with the support extension 74b and the claw portion 23d, it is possible to actuate the swing arm 71 smoothly. Note that, when viewed from the direction of connecting or disconnecting the charging connector 2, if the height of the area overlapping the step portion 23d2 with the engagement surface 41a2 is defined as c1, the relationship expressing c1>(a1+b1) is established. Thus, as shown in FIG. 10, even if both the gaps a1 and b1 would disappear due to a forcible push-up of the claw portion 23d, the engagement between the step portion 23d2 and the engagement surface 41a2 will be maintained.

Figure 10:
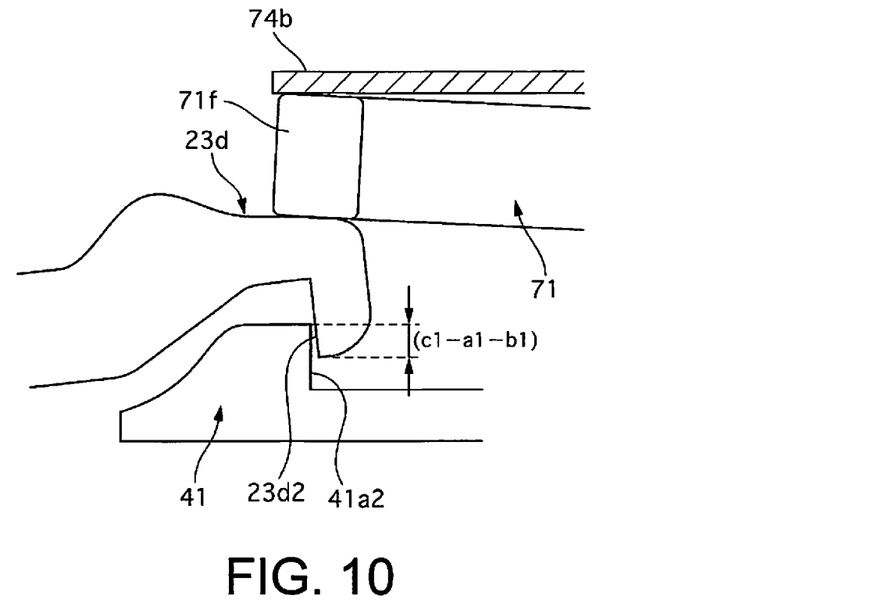
FIG. 10 is a schematic cross-sectional view showing a positional relationship between the engaging member and the swing arm when the engaging member is forcibly operated in the detaching direction in the first embodiment.

FIG. 10 is a schematic sectional view showing the positional relationship between the engaging member and the swing arm when the engaging member is forcibly moved in the separating direction. Assuming that, in a state in which movement of the engaging member 23 in the separating direction is being restricted and the release button 23 is pressed down, the upper surface of the claw portion 23d will contact the lower surface of the swing arm 71 to push up the swing arm 71. At this time, since the swing arm itself is made of resin and the rotation shaft 735b is not designed to be sufficiently rigid, the swing arm 71 will be pushed up vertically with ease due to deformation of the swing arm 71 or inclination of the rotation shaft. However, due to provision of the support extension 74b, the contact with this support extension 74b will suppress further deformation. In addition, since a force is applied only in the thickness direction of the swing arm 71, despite the swing arm being of resin, a sufficient strength is secured against a compression force. More specifically, the rotation shaft of the swing arm 71 extends in a direction different from the insertion and removal direction of the charging connector 2, and has a rotation axis extending different from the direction of rotation axis of the engaging member 23. Stated even more specifically, the direction of rotation shaft of the swing arm 71 and the direction of the rotation shaft of the engaging member 23 are not parallel to each other. The engaging member is restricted or limited in the movement by interposing the swing arm 71 in the separating direction of the claw portion 23d, and the extension support 74b is provided further. Thus, even if the excessive force is input from the claw portion 23, since the force does not act in the rotational direction of the swing arm 71, it is not necessary to form the swing arm 71 rigid with respect to rotational direction. Moreover, it is possible to achieve and maintain a sufficient restricting state without requiring the structure around the rotational shaft strong.

As described above, the first embodiment exhibits the operational effects enumerated below:

(1) A charging port 4 is provided that has a convex portion 41a (engaged portion) for engaging a claw portion 23d (engaging portion) of a charging connector 2 by an operation of an operator. Further, a lock mechanism 7 is provided that achieves a lock state that restricts release from the engaged state by restricting or limiting the releasing operation of the claw portion 23d due to movement of the swing arm 71 (restricting member) in the locking direction and an unlock state that allows the releasing operation through a movement in the unlocking direction opposite to the locking direction. Still further, the swing arm 71 (restricting member) is configured such that, with respect a reference line connecting the center of rotation thereof when placed in the separating direction of the engaging member 23 and the center of rotation of the engaging member 23, the top view area in the rotational direction toward a restricting state is smaller than the top view are in the rotational direction toward a non-restricting state. Therefore, it is possible to prevent the charging connector 2 from being released unexpectedly during charging. Further, it is possible to reduce the roof portion (roof portion in the escape region) of the swing arm 71 covering the engaging member 23 to thereby make it difficult for icicle-shaped obstacles to be formed. Therefore, the swing arm 71 maybe operable smoothly when releasing the lock.

(2) The swing arm is further configured such that, with respect a reference line connecting the center of rotation when placed in the separating or releasing direction of the engaging member 23 and the center of rotation of the engaging member 23, the top view shape of the outermost diameter portion 71f in the rotational direction to the restricting state and the top view shape of the outermost diameter portion 71f in the rotational direction to the non-restricting state are symmetric to each other. Put in another way, when the swing arm 71 is rotated in response to the operation of the lock actuator 73, even if a sufficient rotation is not assured due to a failure and the like, the swing arm 71 may be place more reliable in the separating direction of the claw portion 23d since the length of the outermost diameter portion 71f is secured.

Second Embodiment

Figure 11:
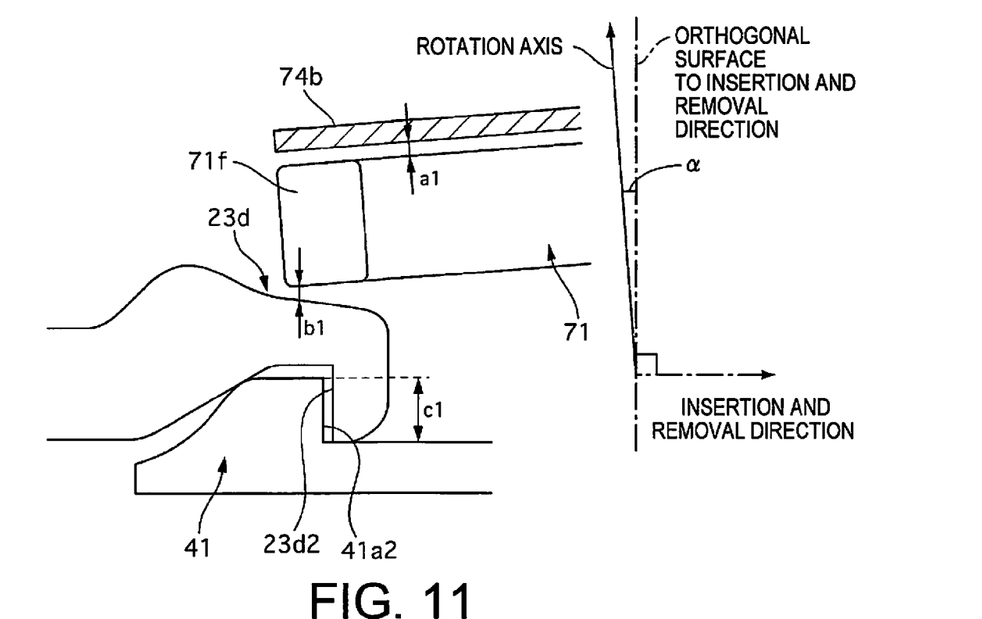
FIG. 11 is a schematic cross-sectional view showing a positional relationship between the engaging member and the swing arm in a second embodiment.

Now, a description is given of a second embodiment. Since a basic configuration is the same as in the first embodiment, only the points of difference are discussed. FIG. 11 is a schematic sectional view showing the positional relationship between the engaging member and the swing arm. In the first embodiment, the rotational axis of the swing arm 71 is disposed on an orthogonal surface of the insertion and removal direction of the engaging member 23. In contrast, in the second embodiment, a predetermined angle α is provided with respect to a direction intersecting the plane perpendicular to the direction of insertion and removal. The predetermined angle α is set in the tilting direction on the claw portion 23d side. Thus, even if the claw portion 23d is pushed up by force, it is possible to restrict stably by receiving the force in the axial shaft of the rotary axis of the swing arm 71. Besides, while an example of forming a support extension 74b is provided also in the second embodiment, when the strength is secured, the support extension may not be provided in particular.

Third Embodiment

Figure 12:
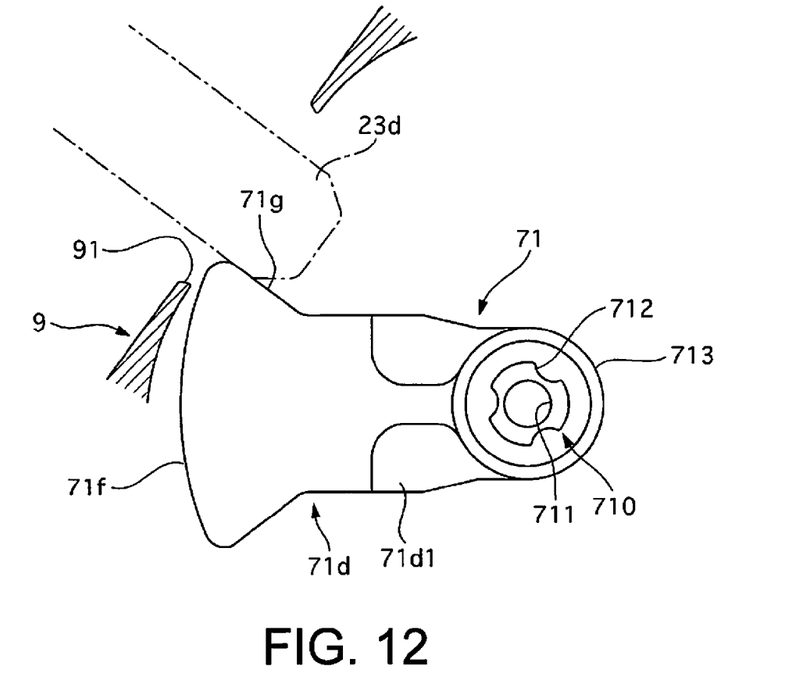
FIG. 12 is a bottom view showing a configuration of the swing arm of the lock mechanism in a third embodiment.

Now, a description is given of a third embodiment. Since a basic configuration is the same as in the first embodiment, only the points of difference are discussed. FIG. 12 is a bottom view showing the configuration of the swing arm of the lock mechanism of the third embodiment. Whereas in the first embodiment, an asymmetric shape is used with respect to the 01 axis, in the third embodiment, a symmetrical shape presents a point of difference. Further, when transitioning to the restricting or limiting state in response to rotational movement of the swing arm 71, in a top view, the side end shape of the claw portion 23d is formed to coincide with the shape of the side end part 71g of the swing arm 71. Therefore, when transitioning to the limiting or restricting state, in a top view, such a situation may arise quickly in which the large overlapping area between the swing arm 71 and the claw portion 23 is obtained. Thus, for example, even if the swing arm 71 is in operation and not sufficiently rotatable due to a failure condition of the lock actuator 73 and the like, the lock state may be maintained more reliably.

Fourth Embodiment

Figure 13:
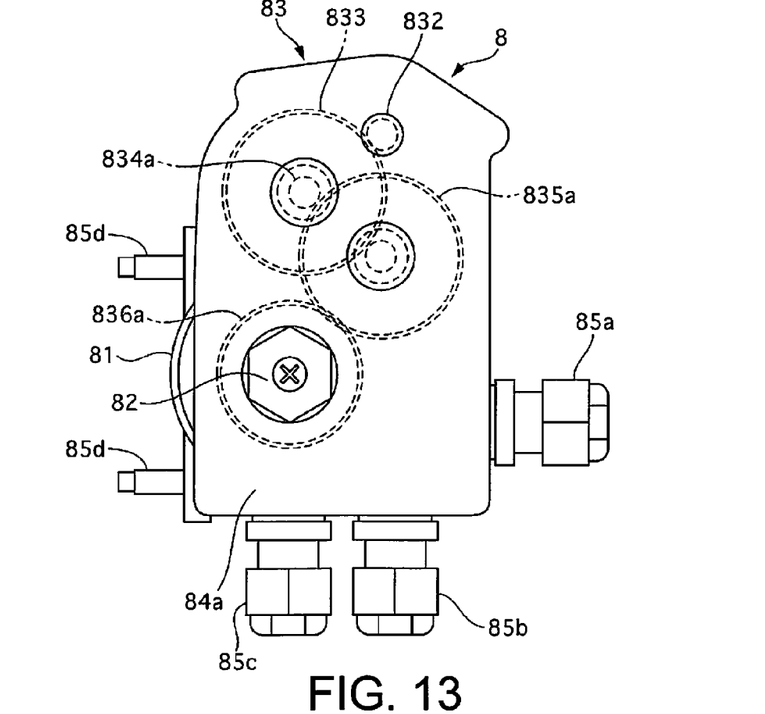
FIG. 13 is a top view showing a configuration of the lock mechanism in a fourth embodiment.
Figure 14:
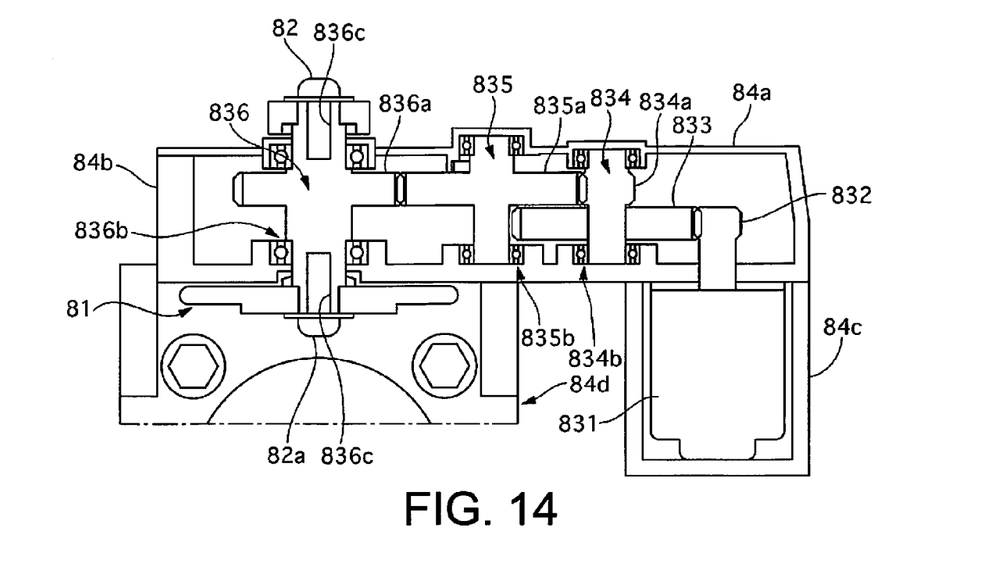
FIG. 14 is a gear shaft cross-sectional view of the lock mechanism in a fourth embodiment.

Now, a description is given of a fourth embodiment. Since a basic configuration is the same as in the first embodiment, only the points of difference are discussed. FIG. 13 is a plan view illustrating the configuration of the lock mechanism of the fourth embodiment. FIG. 14 is an inter-gear shaft cross-sectional view of the lock mechanism of the fourth embodiment. As compared to the lock mechanism 7 in the first embodiment in which a swing arm is rotated, in the lock mechanism 8 in the fourth embodiment, a rotary plate 81 is rotatable, which represents a point of difference over the first embodiment. The lock mechanism 8 has a lock actuator 83 and is composed of a plurality of gear sets accommodated in a housing 84 of the lock actuator 83 and a rotary plate 81. The housing 84 is provided with a lower housing 84b open at the top, an upper housing 84a covering the upper surface of the lower housing 84b, a bracket 84b formed below the rotary plate 81 for mounting the charging port 4 and the like, and a motor accommodating portion 84c for accommodating the motor 831. Further, the bracket 84b is provided with a support member 85b for fixedly supporting on vehicle side and harness ports 85a, 85b, 85c for connecting the motor 831, sensors (not shown) and the like with harness.

A pinion 832 which is connected to the motor 831 is constantly meshed with a first gear 833 integrally rotatable with a first rotation shaft 834. A first rotation shaft gear 834a is formed on the outer periphery of the first rotation shaft 834 and is in a constantly meshed relation with a second gear 835a integrally rotatable with a second rotation shaft 835. The second gear 835a is meshed constantly with a third gear 836a rotatable integrally with a third rotation shaft 836. The first rotation shaft 834, the second rotation shaft 835 and the third rotation shaft 836 are rotatably supported on bearings 834b, 835b, 836b with respect to the upper housing 84a and the lower housing 84b. Thus, a sufficient strength is secured against a force in a shaft tilting direction. When a drive command is output to the motor 831, a rotational driving force is transmitted from the first rotation shaft 834 through the second rotation shaft 835 to the third rotation shaft 836 to thereby rotate the rotary plate 81.

Screw holes 836c are formed in the axial portion of the third rotation shaft 836 at both ends, and the rotary plate 81 is fixed from the side of the lower housing 84b by a screw 82a. Note that the emergency screw 82 can be rotated by a Phillips screwdriver, or a hex bolt portion formed on the outer periphery may be turned with a wrench.

Note that the tightening direction of the emergency screw 82 is set to be the same as the unlocking direction of the rotary plate 81. That is, even if a failure or the like occurs in the lock actuator 83 and the release operation is no longer possible at all, by tightening the emergency screw 82, it is possible to rotate the rotary plate 81 in the unlocking direction. This emergency screw 82 is arranged to be exposed within a hood. To open the hood, operation of a hood release lever within a passenger compartment is a normal process. Once this release lever is operable, the emergency screw is provided at a position easily accessible. Moreover, the position is selected so as not to be accessible even if a charging lid 32 is opened. Therefore, it is devised so as not to be able be operable by others who are inaccessible freely in the passenger compartment. Further, since operation can be made easily with a Phillips screwdriver or the like that are present in an onboard tool kit or the like, it is releasable by the operator.

Figure 15:
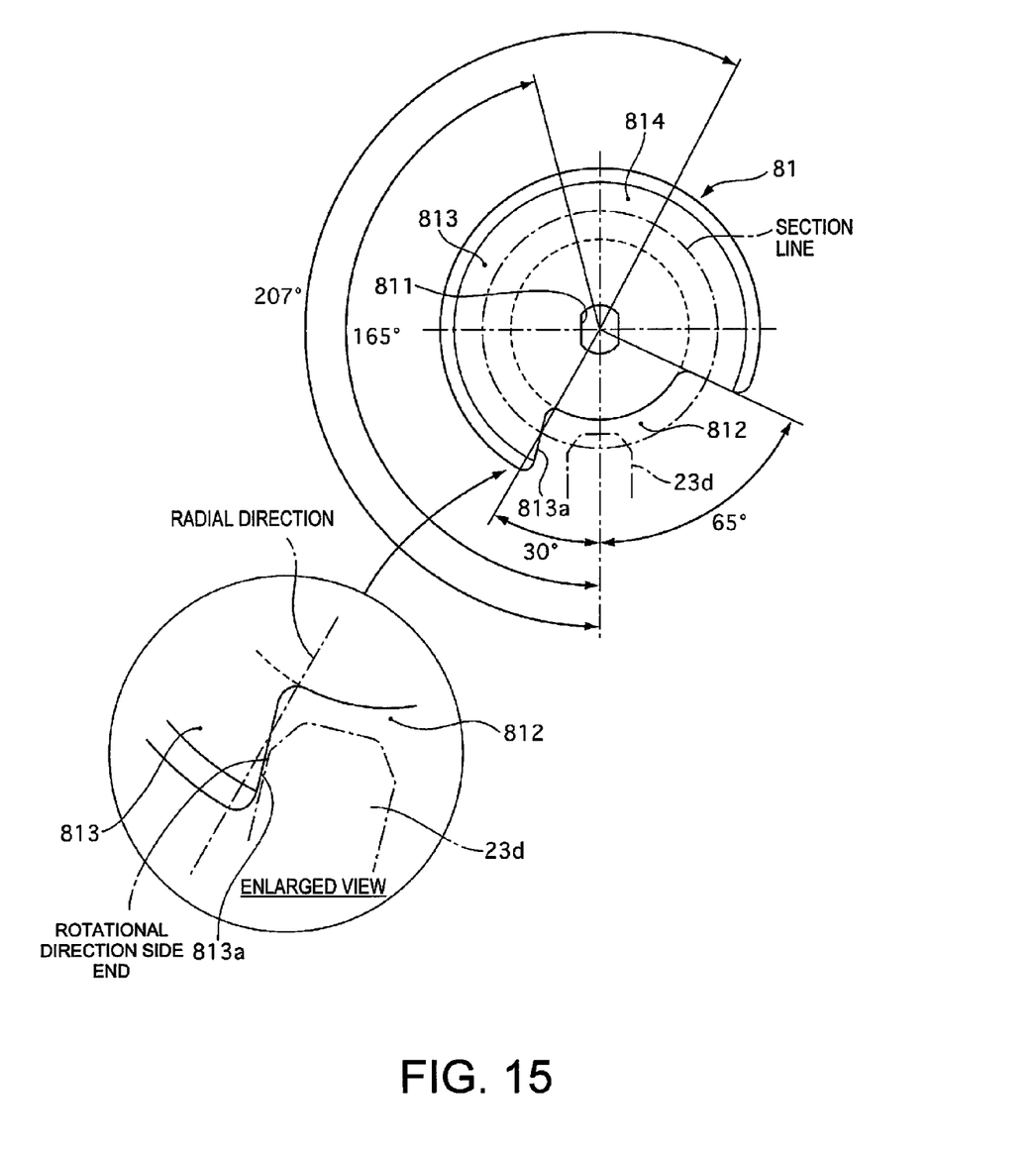
FIG. 15 is a top view showing a configuration of a rotary plate in the fourth embodiment.

FIG. 15 is a top view showing the configuration of the rotary plate in the fourth embodiment. The rotary plate 81 is of a generally disc shaped with a thorough hole with width across flats 811 for receiving the third rotation shaft 836, and has a notch 812 cut out partly and circumferentially and a plate portion 813 not being cut out. Note that the positional relations between the rotary plate 81 and the claw portion 23d as shown in FIG. 15 reflects a state in which the lock mechanism 8 is in non-restriction state and the charging connector 2 is inserted into the charging port 4. Respective positional relations are described below with identifying the center position of the claw portion 23d as 0° and a clockwise direction as positive.

The notch portion 812 is formed in a range spanning in the circumferential direction from −65° to +30°, i.e. in a size of in a size of 95°. Since the tip of the claw portion 23d occupies a size of about 40° at the maximum in the circumferential direction, the notch portion 812 may be said to have at least twice the length of the rotational direction of the claw portion 23d. Consequently, when outputting the release command to the lock actuator 83, even if the position is excessively returned back due to failure or the like, it is possible to maintain the released state.

Further, the circumferential length of the notch or cutout portion 812 is set sufficiently longer than the circumferential length of the pawl portion 23d for the following reason. That is, if the dust or the like is attached to the notch or cutout portion 812, the dust of sticky nature may clog the cutout portion 812. In this case, if the circumferential length of the cutout portion 812 is short, the dust may adhere more strongly over the both end portions of the cutout portion 812. In contrast, by lengthening the circumferential length of the 812 cutout portion, the state in which the dust adheres across the opposite ends may be avoided. Also, even if dust adheres only at one end, since the other side forms an open end, dust can easily fall downward to thereby eliminate the dust or rubbish appropriately.

The plate portion 813 is formed over a range spanning between +30° and +295°, i.e. in a size of 265°. The radial end of the plate portion 813 is formed with a smooth end over the entire circumference. The notch end 813a that represents both a circumferential starting end of the plate portion 813 and a circumferential end of the notch portion 812 is shaped to be inclined with respect to the radial direction. As shown in a partial enlarged view of FIG. 15, the notch end portion 813a is inclined to a narrow side of the region of the notch portion 812. Specifically, when the rotary plate 81 is rotated and begins to be located in the separating direction side of the claw portion 23d, the notch end portion 813a is inclined so as to be roughly parallel with the side end on the rotation direction of the claw portion 23d. Thus, it is possible in top view to overlap a large area with the claw portion 23d more quickly so as to achieve a positive locking condition early.

Figure 16:
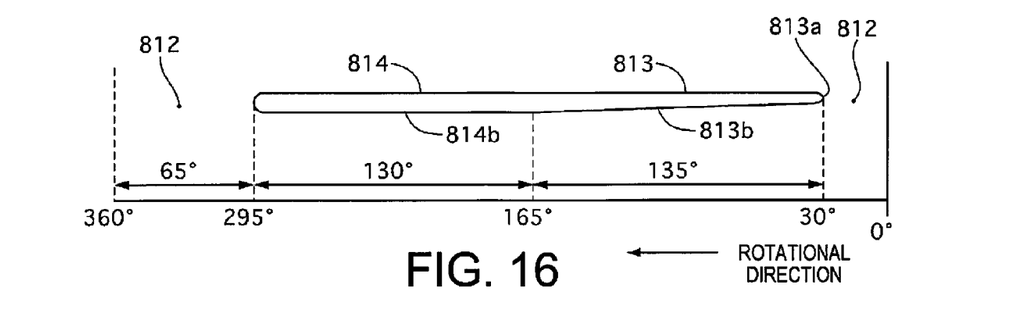
FIG. 16 is a cross-sectional view with a sectional shape being extended linearly along a section line drawn in the circumferential direction of the rotary plate in FIG. 15.

FIG. 16 is a sectional view in which a sectional shape along the section line drawn in the circumferential direction of the rotary plate of FIG. 15 is extended linearly. As shown in the sectional view, the first rotary plate surface 813b shown in the range between 30° and 165° is formed with a tapered surface approaching the claw portion 23d toward the rotation direction. Thus, even if there is a variation in the thickness of the claw portion 23d and such a slightly thick one is to be used, the rotary plate 81 may be interposed in the separating direction of the claw portion 23d. Further, even if bitten or seized on the claw portion 23d, a relatively easy release of the seizure is assured because of small frictional resistance along with easy deformation.

A second rotary plate surface 814b continuous with the first rotary plate surface 813b is formed as a horizontal surface. That is, when forming the tapered surface continuously along the rotational direction, the overall thickness of the rotary plate 81 would be thicker and on-vehicle mounted would deteriorate. Further, if a failure or the like occurs in the motor 831 and the motor undergoes an over-speed, there is a possibility that an excessive bite in the claw portion 23d occurs and hinders the release operation. Therefore, by forming the horizontal surface, a compactness is achieved and an excessive biting or jamming at the time of a failure is avoided. The second rotary plate surface 814b is formed over the range of 130°, which is greater than the area occupied by the claw portion 23. Therefore, even if a failure or the like occurs with the motor 831 resulting in an excessive rotation, it is possible to maintain the state of restricting or limiting the claw portion 23d.

Figure 17:
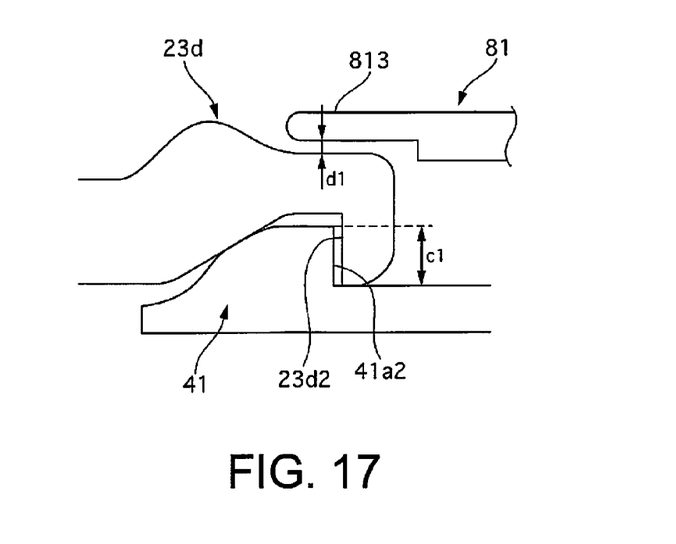
FIG. 17 is a schematic cross-sectional view showing the positional relationship between the engaging member and the rotary plate.

FIG. 17 is a schematic sectional view showing the positional relationship between the engaging member and the rotary plate in the fourth embodiment. A predetermined gap d1 is provided between the lower surface of the rotary plate 81 and the claw portion 23d. Although the gap d1 may be slightly different depending upon a rotation stop position of the rotary plate 81, it is configured to provide a predetermined gap relative to the second rotary plate surface 814b. Therefore, when the rotary plate 81 is rotated, no contact with the claw portion 23d occurs so that a smooth operation of the rotary plate may be ensured. Note that, when the height of the overlapping area between the step portion 23d and the engaging surface 41a is defined as c1, it is configured that the relationship, c1>d1, is established. Thus, even if the gap disappears due to forcible push-up operation of the claw portion 23*d*, the engagement between the step portion 23*d*2 and the engaging surface 41*a*2 is maintained.

In addition, in a state where the lock mechanism 8 is activated and the movement of the engaging member 23 in separating direction is restricted, if the release button 23*a* is pushed, the upper surface of the claw portion 23*d* is in contact with the lower surface of the rotary plate 811 to thereby push up the rotary plate 81. At this time, since the third rotation shaft 836 of the lock actuator 83 is designed to be rigid by a bearing 836*b*, it is possible to hold down the claw portion 23*d*. Further, since the rotary plate 81, even if deformed, provision of the lower housing 84*b* prevents further deformation by contacting to this lower housing 84*b*. Note that an extension may be formed with the lower housing portion 84*b* so as to completely cover the rotary plate in the top view. In this case, even if the rotary plate 81 is deformed or the third rotation shaft 836 is tilted, the deformation of the rotary plate 81 may be fully suppressed.

In this case, since force is only applied in the thickness direction of the rotary plate 81, it is possible to ensure a sufficient strength to withstand the compressive forces even to the rotary plate 81 made of resin. That is, the rotation shaft of the rotary plate 81 extends in a direction different from the insertion and removal direction of the charging connector 2, and has a rotation axis (second rotation shaft) extending in a direction different from the direction of the rotation axis (first rotation shaft) of the engaging member 23. More specifically, the direction of the rotation shaft of the rotary plate 81 is not in parallel with the rotation shaft of the engaging member 23, and the rotary plate 81 is configured to be interposed in the separating direction of the claw portion 23*b* to restrict or limit movement thereof. Further, a lower housing 84*b* is also provided. Therefore, an excessive force input from the claw portion 23*d* would not exert in the rotational direction of the rotary plate 81 so that it is not necessary for the rotary plate 81 to be formed rigid in the rotational direction. In addition, without requiring the structure near the rotation shaft to be strong, a sufficient limiting or restricting state may be achieved.

The present invention has been described based on respective embodiments. Other configurations may be employed. In the first embodiment, a charging port installed in the front of the vehicle, the same may be provided rearward of the vehicle or on the side of the vehicle. Moreover, the description has been given of an electric vehicle, but a plug-in hybrid vehicle or the like is equally applicable.

The invention claimed is:

1. A charging port locking device comprising:
a charging port having an engaged portion configured to be engaged with an engaging portion of a charging connector by an operation of an operator; and
a lock mechanism including a restricting member movably mounted with respect to the charging port between a locking state that restricts release of an engaged state by restricting a releasing operation of the engaging portion due to rotational movement of the restricting member in a locking direction and an unlock state that allows the releasing operation by movement of the restricting member in an unlocking direction that is opposite to the locking direction,
the restricting member being configured in the lock state with respect to a reference line connecting a center of rotation of the restricting member and a center of width of the engaging portion as seen in a top view such that a top view area of the restricting member from the reference line in a rotational direction toward a restricting state restricting separation of the engaging portion is smaller than a top view area of the restricting member from the reference line in the rotational direction toward a non-restricting state allowing separation of the engaging portion,
the restricting member being further configured in the lock state with respect to the reference line such that a top view shape of a maximum diameter curved portion of the restricting member from the reference line in the locking direction to the restricting state and a top view shape of a maximum diameter curved portion of the restricting member from the reference line in the rotational direction to the non-restricting state are symmetric to each other.

2. A charging port locking device comprising:
a charging port having an engaged portion configured to be engaged with an engaging portion of a charging connector by an operation of an operator to define an engaged state; and
a lock mechanism including a swing arm swingably mounted with respect to the charging port to rotate about a rotational center between a locking state by rotating in a locking direction and an unlock state by rotating in an unlocking direction that is opposite to the locking direction,
the swing arm being located with respect to the charging port to restrict the engaging portion of the charging connector from being released from the engaged state while the swing arm is in the locking state with the charging connector in the engaged state,
the swing arm being located with respect to the charging port to allow the engaging portion of the charging connector to be released from the engaged state while the swing arm is in the unlocked state with the charging connector in the engaged state,
the swinging arm including an overlapping section that corresponds to a region of the swinging arm between a first arc with a curvature centered on the rotational center and a second arc with a curvature centered on the rotational center, the first arc intersecting with an outermost point of the swing arm from the rotational center, the second arc intersecting with a point of the engaging portion of the charging connector that is closest to the rotational center while in an engaged state,
the overlapping section further including an outermost peripheral portion having a distal end surface facing away from the rotational center, the outermost peripheral portion being symmetrical about the reference line,
the overlapping section further including a first intermediate portion between the outermost peripheral portion and the rotational center extending in the unlocking direction from the reference line and a second intermediate portion between the outermost peripheral portion and the rotational center extending in the locking direction from the reference line, and a top view area of the first intermediate portion is greater than a top view area of the second intermediate portion.

3. The charging port locking device according to claim 2, wherein
the swinging arm further includes a mounting portion swingably mounted with respect to the charging port and a connecting portion extending from the mounting portion to the outermost peripheral portion,
the connecting portion being divided by the reference line into a first connecting section extending in the unlocking direction from the reference line and a second connecting section extending in the locking direction from the reference line, the first connecting section having a top view area that is greater than a top view area of the second region of the connecting portion.

* * * * *